Feb. 16, 1932.                M. H. TIBBETTS                1,845,102
                              TRAWL RUNNER
                          Filed June 17, 1930         2 Sheets-Sheet 2
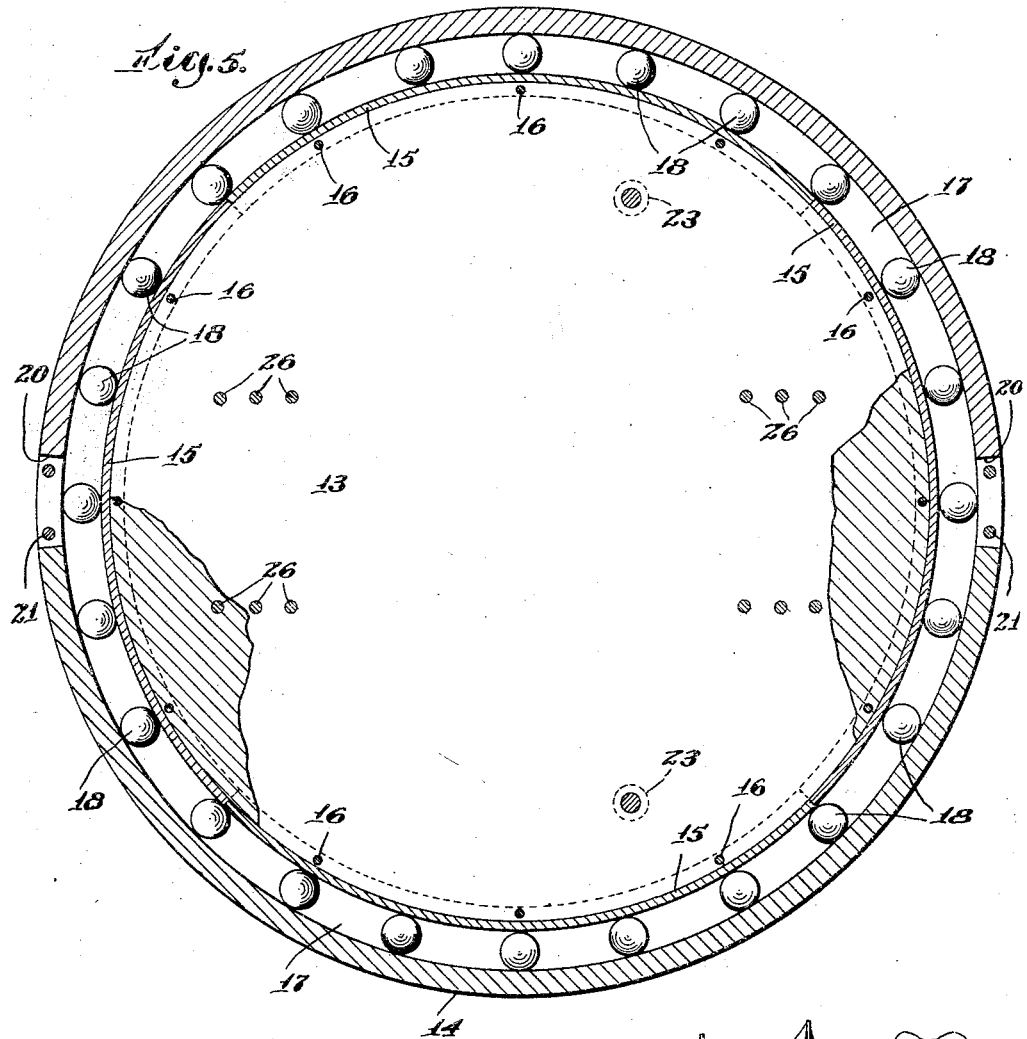
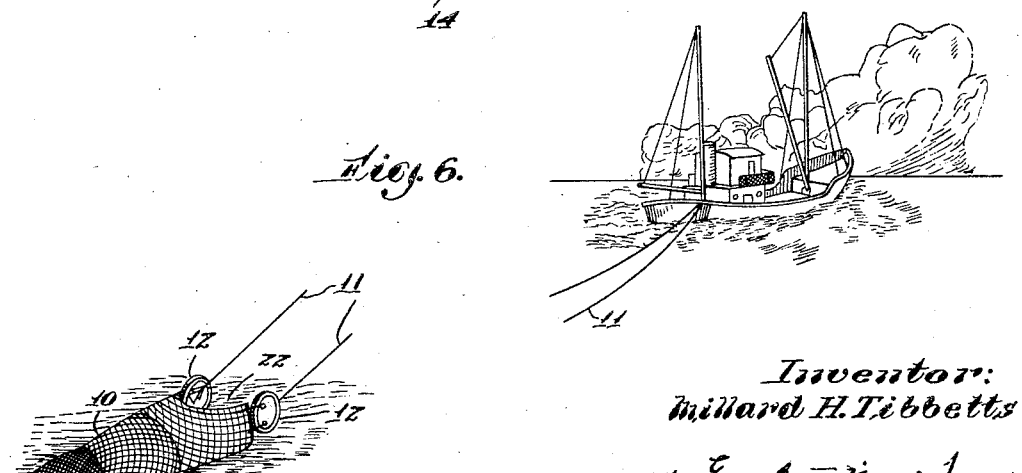
Inventor:
Millard H. Tibbetts
by Emery, Booth, Varney & Townsend
Attorneys Patented Feb. 16, 1932

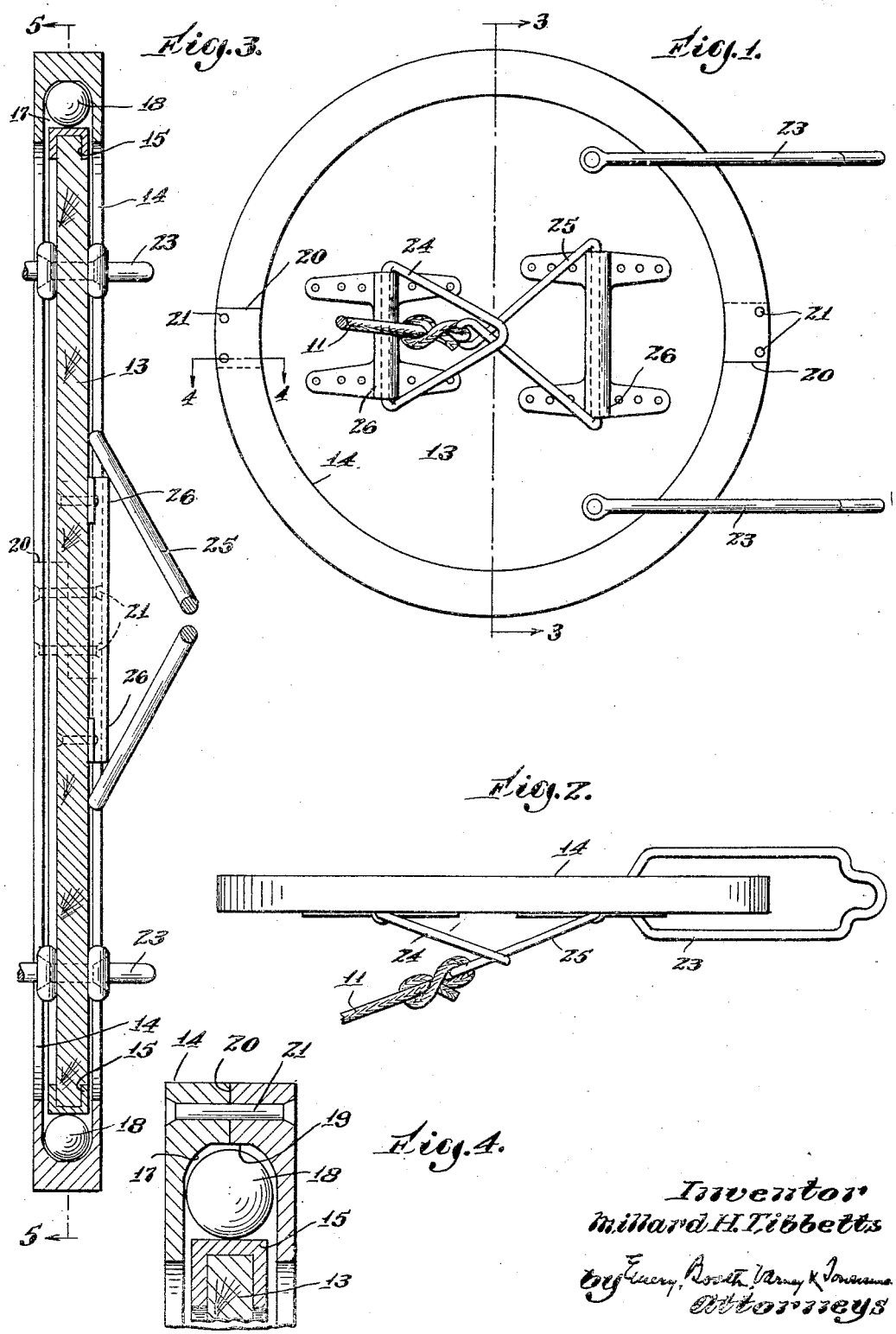

1,845,102

UNITED STATES PATENT OFFICE

MILLARD H. TIBBETTS, OF SOMERVILLE, MASSACHUSETTS

TRAWL RUNNER

Application filed June 17, 1930. Serial No. 461,692.

The present invention relates to apparatus for deep-sea fishing and more particularly to seines of the trawl-net type.

The invention aims to provide novel and useful improvements in shoes or runners for beam-trawl nets, and will best be understood by reference to one specific embodiment thereof selected for illustrative purposes and shown in the accompanying drawings wherein—

Fig. 1 is an elevation of the front or inner face of the runner in operative assembly;

Fig. 2, a top view of the same;

Fig. 3, an enlarged cross-section on the line 3—3 of Fig. 1 showing structural details and the relative positions of the outer or frame portion and the door or inner portion;

Fig. 4, a detail fragmentary section on the line 4—4 of Fig. 1, showing the method of uniting the semi-circular frame sections;

Fig. 5, an enlarged transverse section of the assembled device on the line 5—5 of Fig. 3, showing details in construction of the frame portion, and Fig. 6, an illustrative perspective view showing the relative positions of my invention and a trawler vessel operating the same with connecting drag lines in the usual manner.

A trawl net 10 of the type herein illustrated and to which the present improvement is adapted, is designed for deep-sea fishing, usually being operated at a depth of ten to a hundred fathoms. It is dragged over the sea bottom, which is often rough and encumbered with obstacles, by lines 11 attached to and controlled from a steam trawler, operating on the surface at a considerable distance from the net.

The trawl net 10 is commonly funnel shaped, the front or receiving end being secured at opposite sides to a pair of drag-lines 11 through the medium of the runners 12, which tend to spread apart under pressure of the water and to maintain the mouth of the net in the open position while the vessel is under way.

As the runners are used in pairs, two to each trawl net, and are of like construction, a description of one will serve for both.

The runner comprises a solid central portion 13 constituting a circular flat core or disc movably supported within an outer frame portion or ring 14, which rides upon the sea bottom and is free to rotate about the central portion. The central portion in the present embodiment is formed of matched wood planking of sufficient rigidity and strength to withstand the water pressure, the margin being incased in and protected by a continuous channel rim 15 of metal preferably formed of separate segments, each segment being held in position by transverse bolts 16 suitably countersunk at both ends to lie flush with the rim surfaces.

The frame portion 14 is designed to freely enclose the rim of the central portion, which extends a sufficient distance into the groove or channel 17 formed on the inner edge of the fame portion to prevent displacement of the central portion in either lateral direction. This channel 17 forms a ball race for reception of a series of balls 18, which are distributed in sufficient number around the rim 15 to provide a continuous antifrictional support for the central portion, the outer face of the rim and the bottom of the channel 17, which is preferably formed with a flat face seat 19, constituting opposite supporting surfaces.

The frame portion 14 is preferably constructed of metal, which may be cast or formed in two semi-circular sections rabbeted or otherwise jointed at opposite points 20 and suitably secured together, as by countersunk rivets 21. The frame portion 14 is thus revolubly carried upon the central portion 13 and provides a suitable tread medium for the rough ground conditions often encountered on the sea bottom. Its rounded outline and revolubility cooperate to effect numerous advantages, among which may be mentioned reduced friction and resistance to the water, thereby requiring less traction power and increasing the speed, a tendency to ride over opposing objects such as deeply seated rocks and soft mud bottoms, thus avoiding line breakage, elimination of the twisting or swirling motion common to the usual onepiece runners of square formation, and improved facility in handling on shipboard.

In operation the runners assume an upright position, edge foremost, one on each side of the net at the front opening, being preferably attached to the wings or forward extensions 22 by suitable means, such as the elongated metal loops 23, arranged in pairs and pivotally secured in spaced position at one end to the rear of the central portion or core 13, the free ends being suitably shaped to freely enclose the frame portion 14. Thus positioned these doors under pressure of the water tend to spread relatively apart and to maintain the mouth of the net in the open position, while the weight of the balls 18 tends to keep the net on the sea bottom, no other weighting devices being required. The drag lines 11, which are controlled at their forward ends from the vessel, are secured at the opposite ends to the cores 13 in any suitable manner, as for example by a pair of converging staples, 24, 25 secured by hinges 26 to the inner faces of the cores at selected points on opposite sides of the center best adapted to offset any turning tendencies of the device as a whole while moving through the water.

My invention is not restricted to the precise details of construction or to the form of embodiment herein shown, but embraces all such modifications thereof as come within the scope of the appended claims.

I claim:

1. A device of the class described comprising, in combination, a stationary inner portion for attachment to and support of a trawl-net, and an outer portion mounted on and surrounding the inner portion and free to circulate thereon, said outer portion constituting the sole ground-engaging means and support for both portions.

2. In combination with a trawl-net and drag lines for towing the net, a pair of runners of circular formation for supporting opposite sides of the front end of the net, means for attaching the drag lines centrally to the inner faces of the runners, means for securing the net to opposite faces of each runner, and annular members movably mounted on the runners and providing the sole ground-engaging means, said runners when propelled in the water through the medium of the drag lines assuming upright positions in angular relation to each other.

3. In runners for trawl nets, a self-supporting unicycle structure having a single ground-engaging member and comprising, in combination, two concentric rotative portions, one mounted on and enclosing the other, the outer portion constituting the sole supporting means for both portions.

4. In trawl runners, a self-supporting wheel structure operating in a single track and comprising, in combination, a core portion and a rim portion enclosing the core portion and free to rotate about the same, said rim portion constituting the sole ground-engaging member and providing support for both of said portions.

5. In a device of the class described, a self-supporting wheel runner comprising, in combination, two concentric relatively movable portions, one mounted on and free to rotate about the other, the outer portion constituting the sole ground-engaging member and support for both portions, means for attachment of the inner portion to a drag line, and separate means for attachment of a net to opposite faces of the inner portion.

6. A device of the class described comprising, in combination, a circular inner portion having a peripheral bearing face, an annular outer portion mounted on and free to revolve about the inner portion, and a series of anti-frictional bearing members interposed between the inner and outer portions for the support of the outer portion.

7. A device of the class described comprising, in combination, an inner portion including a disc and a rim on the disc, an outer portion forming a ring around the disc and free to revolve in the plane of the disc, and a series of balls distributed around the disc and engaging the rim of the inner portion for the support of the outer portion, said outer portion having a channel forming a race for the balls and enclosing the rim of the disc.

In testimony whereof, I have signed my name to this specification.

MILLARD H. TIBBETTS.